(12) United States Patent
Gauthier, Jr.

(10) Patent No.: US 11,372,455 B2
(45) Date of Patent: Jun. 28, 2022

(54) IMAGING SENSOR-BASED POSITION DETECTION

(71) Applicant: The Johns Hopkins University, Baltimore, MD (US)

(72) Inventor: Leo R. Gauthier, Jr., Ellicott City, MD (US)

(73) Assignee: The Johns Hopkins University, Baltimore, MD (US)

(*) Notice: Subject to any disclaimer, the term of this patent is extended or adjusted under 35 U.S.C. 154(b) by 726 days.

(21) Appl. No.: 16/277,129

(22) Filed: Feb. 15, 2019

(65) Prior Publication Data

US 2020/0264676 A1    Aug. 20, 2020

(51) Int. Cl.
*G06F 1/16* (2006.01)
*H04W 64/00* (2009.01)
(Continued)

(52) U.S. Cl.
CPC .......... *G06F 1/1686* (2013.01); *B64C 39/024* (2013.01); *B64D 47/08* (2013.01);
(Continued)

(58) Field of Classification Search
CPC .................. G06F 1/1686; B64C 39/024; B64C 2201/127; B64D 47/08; H04N 5/23229; H04W 64/003
See application file for complete search history.

(56) References Cited

U.S. PATENT DOCUMENTS 10,275,899 B2 * 4/2019 Geissler ................ G01S 5/163
2006/0013437 A1 * 1/2006 Nister ...................... G06T 7/73
382/103

(Continued)

FOREIGN PATENT DOCUMENTS

CN   102417037 A * 4/2012 ............ G01S 19/51
CN   105300383 A * 2/2016
(Continued)

OTHER PUBLICATIONS

Kai et al., "An Efficient Closed Form Solution to the Absolute Orientation Problem for Camera with Unknown Focal Length", 2021, MDPI (Year: 2021).*

(Continued)

*Primary Examiner* — Peter D Nolan
*Assistant Examiner* — Kenneth M Dunne
(74) *Attorney, Agent, or Firm* — Todd Farnsworth

(57) ABSTRACT

An example method for determining a mobile device position and orientation is provided. The method may include capturing a two-dimensional image of a surface including at least four markers, and determining a unit direction vector for each of the at least four markers based on an association between a pixel location of each of the at least four markers in the two-dimensional image. The method may further include determining apex angles between each pair of the unit direction vectors, and determining marker distances from the imaging sensor to each of the at least four markers via a first iterative process based on the apex angles. Additionally, the method may include determining the mobile device position with respect to the coordinate frame via a second iterative process based on the marker distances, the apex angles, and the coordinates of each of the at least four markers.

19 Claims, 7 Drawing Sheets

(51) Int. Cl.
    *B64C 39/02*        (2006.01)
    *B64D 47/08*        (2006.01)
    *H04N 5/232*        (2006.01)
    *G05D 1/00*         (2006.01)
(52) U.S. Cl.
    CPC ........... *G05D 1/00* (2013.01); *H04N 5/23229*
           (2013.01); *H04W 64/003* (2013.01); *B64C*
                                   *2201/127* (2013.01)

(56) References Cited

U.S. PATENT DOCUMENTS

| | | | |
|---|---|---|---|
| 2015/0313482 A1* | 11/2015 | Nabutovsky | A61B 5/283 600/509 |
| 2015/0370250 A1* | 12/2015 | Bachrach | G01C 23/00 701/2 |
| 2016/0068264 A1* | 3/2016 | Ganesh | G05D 1/0676 701/2 |
| 2017/0029107 A1* | 2/2017 | Emami | B64C 39/024 |
| 2018/0046187 A1* | 2/2018 | Martirosyan | G06T 7/292 |
| 2019/0220039 A1* | 7/2019 | Wu | B64C 39/024 |
| 2020/0364898 A1* | 11/2020 | Lawlor | G06T 7/74 |
| 2021/0209791 A1* | 7/2021 | De Rijk | G06T 7/73 |
| 2021/0286044 A1* | 9/2021 | Knuuttila | G06K 9/6288 |

FOREIGN PATENT DOCUMENTS

| | | | | |
|---|---|---|---|---|
| EP | 1901153 A1 | * | 3/2008 | ........... G05D 1/0858 |
| EP | 2847741 B1 | * | 8/2018 | ............. G01C 11/02 |
| WO | WO-2004081868 A2 | * | 9/2004 | ............. G06K 9/209 |
| WO | WO-2020209167 A1 | * | 10/2020 | ............. B64D 47/08 |

OTHER PUBLICATIONS

Horaud et al, "An Analytic Solution for the Perspective 4-Point Problem", Jan. 2014, Computer Vision Graphics and Image Processing, Elsevier (Year: 2014).*

William Martin, "Pose Estimation of 4 to N-Point Targets: Implementation and Applications ", 2013, University of Tennessee.pp. 1-35 (Year: 2013).*

Xiao Xin Lu, "A Review of Solutions for Perspective-n-Point Problem in Camera Pose Estimation", 2018, Journal of Physics: Conference Series. (Year: 2018).*

Shiqi et al, "A Robust O(n) Solution to the Perspective-n-Point Problem", 2012, IEEE Transactions on Pattern Analysis and Machine Intelligence, vol. 34 (Year: 2012).*

* cited by examiner

IMAGING SENSOR-BASED POSITION DETECTION

TECHNICAL FIELD

Example embodiments generally relate to position and orientation systems and, in particular, relate to imaging sensor-based determination of position and orientation.

BACKGROUND

Global positioning system (GPS) technology has become commonplace for determining the position of an object on the Earth. To determine a position of an object, a co-located device may receive radio frequency (RF) signals from four or more satellites. While GPS has become a convenient technology to leverage when available, there are many environments where signals from the satellites are not available to be received or the environment is designated to be free of RF signals. GPS may not be sufficiently available to perform position determinations in such environments due to, for example, electromagnetic interference (EMI) and other magnetic distortions, radio frequency multipath issues, and satellite signal drop-outs. Additionally, there are applications where GPS or other conventional position measurement devices are not sufficiently accurate to support necessary determinations of an object's position. Such environments and applications may therefore require alternative solutions to the problem of determining an object's position, as well as the object's orientation.

BRIEF SUMMARY OF SOME EXAMPLES

According to some example embodiments, a method for determining a mobile device position with respect to a coordinate frame is provided. The example method may comprise capturing, by an imaging sensor affixed to the mobile device, a two-dimensional image of a surface comprising at least four markers. In this regard, coordinates of each of the at least four markers with respect to the coordinate frame may be known. The example method may further comprise determining a unit direction vector for each of the at least four markers based on an association between a pixel location of each of the at least four markers in the two-dimensional image, and determining, via processing circuitry, apex angles between each pair of the unit direction vectors. The example method may further comprise determining, via the processing circuitry, marker distances from the imaging sensor to each of the at least four markers via a first iterative process based on the apex angles, and determining, via the processing circuitry, the mobile device position with respect to the coordinate frame system via a second iterative process based on the marker distances, the apex angles, and the coordinates of each of the at least four markers. According to some example embodiments, the example method may further comprise determining a mobile device orientation with respect to the coordinate frame based on the mobile device position and the coordinates of at least three of the at least four markers.

According to some example embodiments, a system is also provided. The system may comprise a mobile device comprising an imaging sensor affixed to a body of the mobile device. The imaging sensor may be configured to capture two-dimensional images. The system may further comprise processing circuitry configured to receive the captured two-dimensional images from the imaging sensor for processing. The processing circuitry may also be configured to receive a two-dimensional image comprising at least four markers from the imaging sensor. In this regard, the coordinates of each of the at least four markers with respect to a coordinate frame system may be known. Further, the processing circuitry may be configured to determine a unit direction vector for each of the markers based on an association between a pixel location of each of the at least four markers in the two-dimensional image and determine apex angles between each pair of the unit direction vectors, and determine marker distances from the imaging sensor to each of the at least four markers via a first iterative process based on the apex angles. The processing circuitry may be further configured to determine a position of the mobile device with respect to the coordinate frame system via a second iterative process based on the marker distances, the apex angles, and the coordinates of each of the at least four markers. According to some example embodiments, the processing circuitry may be further configured to determine a mobile device orientation relative to the coordinate frame based on the mobile device position and the coordinates of at least three of the at least four markers.

According to some example embodiments, an unmanned aerial vehicle is provided. The unmanned aerial vehicle may comprise a maneuvering assembly that is controllable to change a position, orientation, and direction of travel of the unmanned aerial vehicle. The unmanned aerial vehicle may further comprise an imaging sensor affixed to a body of the unmanned aerial vehicle. In this regard, the imaging sensor may be configured to capture two-dimensional images. The unmanned aerial vehicle may also comprise a processing circuitry configured to control the maneuvering assembly and receive the captured two-dimensional images from the imaging sensor for processing. The processing circuitry may be configured to receive a two-dimensional image comprising at least four markers from the imaging sensor. In this regard, the coordinates of each of the at least four markers with respect to a coordinate frame system may be known. The processing circuitry may be further configured to determine a unit direction vector for each of the markers based on an association between a pixel location of each of the at least four markers in the two-dimensional image, and determine apex angles between each pair of the unit direction vectors. The processing circuitry may be further configured to determine marker distances from the imaging sensor to each of the at least four markers via a first iterative process based on the apex angles, and determine a position of the unmanned aerial vehicle with respect to the coordinate frame system via a second iterative process based on the marker distances, the apex angles, and the coordinates of each of the at least four markers. According to some example embodiments, the processing circuitry may be further configured to determine a vehicle orientation relative to the coordinate frame based on the vehicle position and the coordinates of at least three of the at least four markers.

BRIEF DESCRIPTION OF THE SEVERAL VIEWS OF THE DRAWING(S)

Having thus described some embodiments in general terms, reference will now be made to the accompanying drawings, which are not necessarily drawn to scale, and wherein:

DETAILED DESCRIPTION

Figure 1:
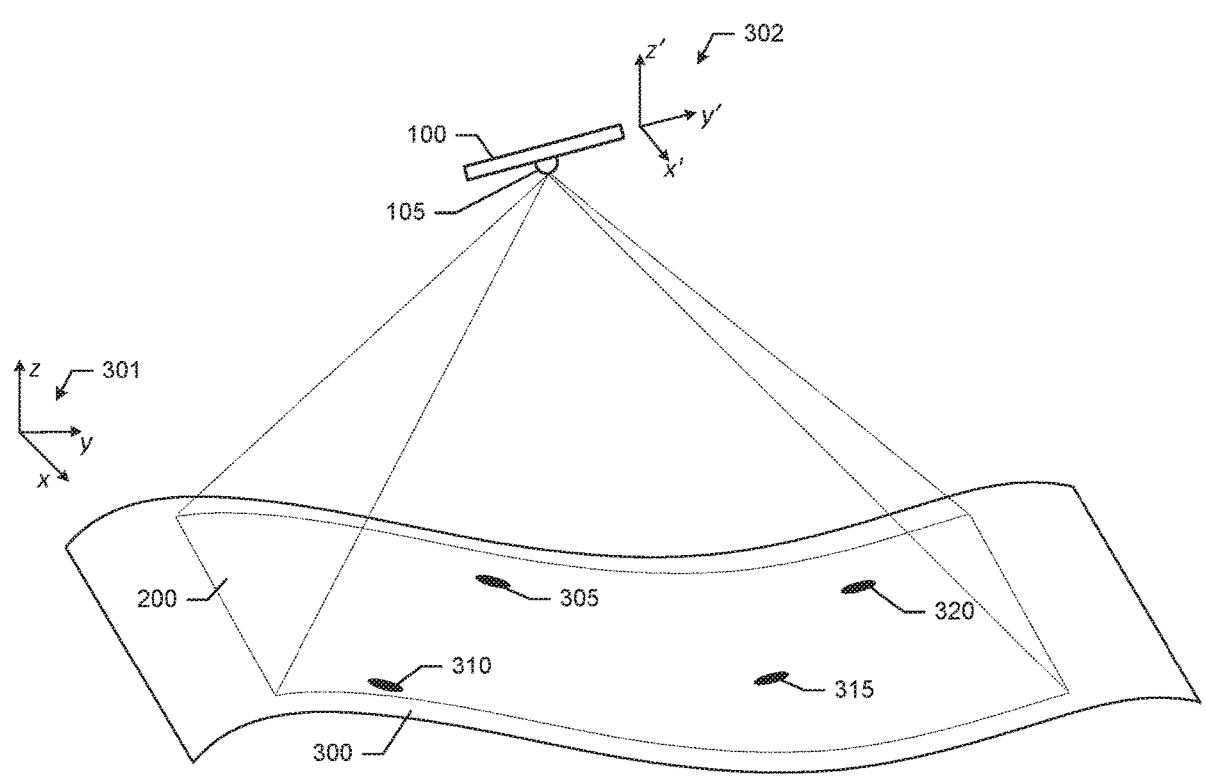
FIG. 1 illustrates a mobile device with an image sensor and a field-of-view of the image sensor onto a surface according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Various example embodiments, methods, systems and apparatuses are provided that determine a position or orientation of a mobile device via image processing of an image captured by an imaging sensor of the mobile device. Accordingly, via example embodiments described herein, six degrees of freedom (6-DOF) may be determined with respect to three positional dimensions and three orientational dimensions. The mobile device may be any type of vehicle (e.g., a piloted or autonomous) capable of movement in any land, sea, space, or air environments. According to some example embodiments, the mobile device may be a smaller-scale device such as a tip of a surgical device moving within a body. According to some example embodiments, image processing may be performed to identify at least four markers within a captured image. Such markers may be any recognizable feature in the image that can be correlated to known coordinates in a coordinate system (e.g., a three-dimensional coordinate system). For example, the markers may be objects that have been specifically placed to operate as markers for position determination according to some example embodiments. Such markers may be lights or colored objects that are disposed on the ground around, for example, a landing location. However, according to some example embodiments, the markers may be natural landmarks (e.g., a rock formation) that have known coordinates or a man-made feature such as a corner of a building or an intersection of roads. Further, markers may be landmarks within an individual's body that have been previously mapped via magnetic resonance imaging or the like. With at least four markers being included in a captured image, an iterative process may be performed, according to some example embodiments, using the known coordinates of the at least four markers to determine a position of the mobile device at the time of the image capture. Further, according to some example embodiments, the position of the mobile device may be determined in, for example, three dimensions, despite the captured image of the markers being a two-dimensional image.

The image processing performed to determine the position of the mobile device may utilize a direction vector association between each of the pixels of an image and a relative location of the imaging sensor that captured the image. Accordingly, as further described below, the direction vectors for each of the markers may be determined based on the pixel or pixels of the captured image that depict the markers. Additionally, apex angles between each of the pairs of direction vectors for the at least four markers may be determined. Based on the apex angles, distances between the imaging sensor and each of the markers may be determined via an iterative process that may converge at a solution as further described below. Via further processing based on the marker distances, the apex angles, and the known coordinates of the at least four markers, the position of the mobile device may be determined through another iterative process that converges at a solution as further described below. Additionally, according to some example embodiments, an orientation of the mobile device may be determined based on the coordinates of at least three of the markers, along with the determined position of the mobile device.

As such, some example embodiments offer a technical solution to the technical problem of determining a device position or orientation when, for example, other techniques for determining a position or orientation are not feasible or unavailable. Further, in situations where, for example, only an imaging sensor is available to obtain information about a device's environment, various example embodiments offer a reliable technical solution for performing position and orientation determinations. Environments where other positioning techniques, such as GPS, may be unavailable may include enclosed environments, such as in a building, in a cave, under heavy tree canopy, or other locations where GPS signals cannot reach the device or may be unreliable due to, for example, GPS spoofing. Further, environments where, for example, GPS may be infeasible may include underwater environments or smaller-scale positioning, such as positioning within the human body. Further, in some environments that, for example, are exposed to high degrees of shock or vibration, positioning techniques based on gyroscopes, magnetometers, accelerometers, or other similar sensors may fail to operate. Further, other positioning sensors and related techniques may not be viable in environments where radio frequency (RF) interference in the form of EMI, RF multipath, satellite drop-outs, and magnetic distortions. Additionally, for some applications, other conventional positioning or orienting sensors may not be able to provide the level of accuracy required. Accordingly, the technical solutions provided herein improve upon the state of the art by providing additional positioning and orientation determining techniques that leverage image processing approaches.

The example embodiments described herein may offer benefits and advantages in a number of applications and settings. In this regard, some example embodiments may offer benefits in the area of precision flight guidance, navigation, and control (GNC) of spacecraft or aircraft, including, but not limited to, unmanned aerial vehicles (UAVs), balloons, or other platforms using ground markers, possibly in the form of optical beacons or lasers. Further, example embodiments may provide landing and take-off assistance for hovering platforms on moving surfaces (e.g., deck of a ship), collision avoidance systems, and support for drone pickup and delivery systems. Some example embodiments may be applied in the technical area of smart car navigation and smart traffic networks. Applications for some example embodiments may include performing damage assessment after natural disasters such as tornadoes, fires, hurricanes, floods, landslides, earthquakes, or the like. Similarly, some example embodiments may be leveraged to assist with surveys for archaeology, geophysics, underground spaces, buildings, collapsed structures, bridges, mining, farming, vegetation and wildlife monitoring, environmental conservation monitoring, construction or transportation projects, real-time traffic monitoring, monitoring wind power or solar arrays, forensic scene reconstruction for law enforcement, power line maintenance, or infrastructure inspections. Further, some example embodiments may be applied to assist with augmented geotagging within photos or videos by adding platform orientation information and three-dimensional scene reconstruction. Additionally, some example embodiments may be useful for underwater applications in the context of, underwater wreck/reef navigation, surveying for scuba divers, reef monitoring, or snorkelers. Finally, some example embodiments may be applied in smaller contexts such as in surgical and dentistry applications.

According to some example embodiments, FIG. 1 illustrates an example mobile device 100 capturing an image of a field-of-view 200 on a surface 300 within an environment defined with respect to a coordinate frame 301. Coordinate frame 301 (x,y,z) may be defined as a "world" coordinate fame (or system) and is stationary with respect to the surface 300. The mobile device 100 may be any type of device that is capable of moving relative to an environment of the device 100, and therefore the ability to determine a position of the mobile device 100 is useful. While some example embodiments are described in the context of a mobile device 100 that is, for example, an aerial drone, the mobile device 100 may alternatively be, for example, any type of aerial vehicle, any type of land vehicle (e.g., a car), any type of spacecraft, or any type of aquatic vehicle (e.g., a boat or a submarine). Further, in example embodiments where the mobile device 100 is a vehicle, the vehicle may be piloted by an individual or autonomously controlled. Further, as mentioned above, the mobile device 100 may also be a device that moves within, for example, a body. In this regard, the mobile device 100 may be an end of a fiberscope or endoscope that may be used to capture images within a body and support, for example, medical, diagnostic or surgical activities.

As such, the mobile device 100 may include navigation components that permit the mobile device 100 to move relative to the environment. In this regard, according to some example embodiments, the mobile device 100 may include a maneuvering assembly (e.g., maneuvering assembly 520 of FIGS. 5A and 5B) that is configured to control the physical movement of the mobile device 100 within the environment. The maneuvering assembly may include one or more motors that may rotate propellers, wheels, or the like to cause the mobile device 100 to move. Further, the maneuvering assembly may include steering components (e.g., moveable flaps, wheel pivot actuators, control cables, or the like) configured to control a direction of movement of the mobile device 100.

As mentioned above, the mobile device 100 may include an imaging sensor 105. The imaging sensor 105 may be any type of sensor configured to capture an image of a surface 300 within an environment of the mobile device 100.

According to some example embodiments, the imaging sensor 105 may be a calibrated, high-resolution wide field-of-view camera. The imaging sensor 105 may be configured to capture images in the visible spectrum. However, the imaging sensor 105 may, additionally or alternatively, be configured to capture images in other portions of the spectrum such as, for example, ultraviolet or infrared portions of the spectrum. In this regard, the imaging sensor 105 may be configured to capture images at wavelengths that provide information about the physical environment of the mobile device 100 and markers may be tailored for those wavelengths. For example, a system that uses an infrared camera may employ markers that radiate infrared energy in a manner that provides a unique thermal signature seen in the image. According to some example embodiments, the imaging sensor 105 may be a digital camera.

The imaging sensor 105 may be configured to capture an image of the field-of-view 200 of the imaging sensor 105. In this regard, according to some example embodiments, the imaging sensor 105 may be configured to capture a two-dimensional image of the sensor's field-of-view 200. The imaging sensor 105 may also be configured to generate signals that correspond to the captured image for delivery to processing circuitry to perform image processing.

The imaging sensor 105 may be affixed to the mobile device 100 in a manner such that a relationship between the position and orientation of the mobile device 100 and the imaging sensor 105 may be defined. According to some example embodiments, the imaging sensor 105 may be rigidly affixed to the mobile device 100 and therefore a static position and orientation relationship between the imaging sensor 105 and the mobile device 100 can be defined. For example, as shown in FIG. 1, imaging sensor 105 may be affixed to an underside of the mobile device 100 and may move with the mobile device 100 in any direction relative to the coordinate frame 301 and may be oriented the same as the mobile device 100 (e.g., pitch, yaw, and roll) within the coordinate frame 301. According to some embodiments, the imaging sensor 105 may be attached to the mobile device 100 via a 3-axis gimbal that enables roll, pitch, and yaw control of the imaging sensor 105 that is independent of the roll, pitch, and yaw of the mobile device 100. According to some embodiments, the gimbal may provide feedback on its roll, pitch, and yaw state to the mobile device 100 to facilitate the processing of data from the imaging sensor 105 as regards to the use of the computed positions and orientations of the imaging sensor 105 for maneuvering of the mobile device 100.

Figure 3:
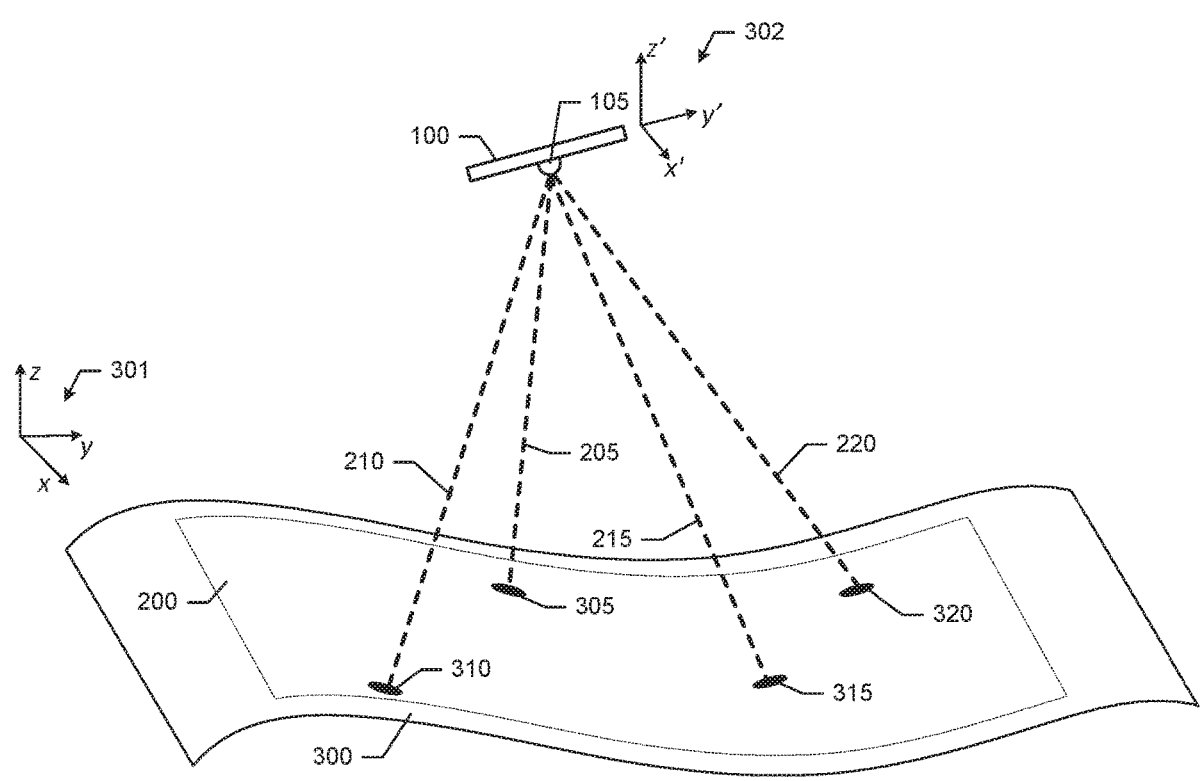
FIG. 3 illustrates a mobile device with an image sensor and unit direction vectors to each marker within a plurality of markers according to some example embodiments.
Figure 4:
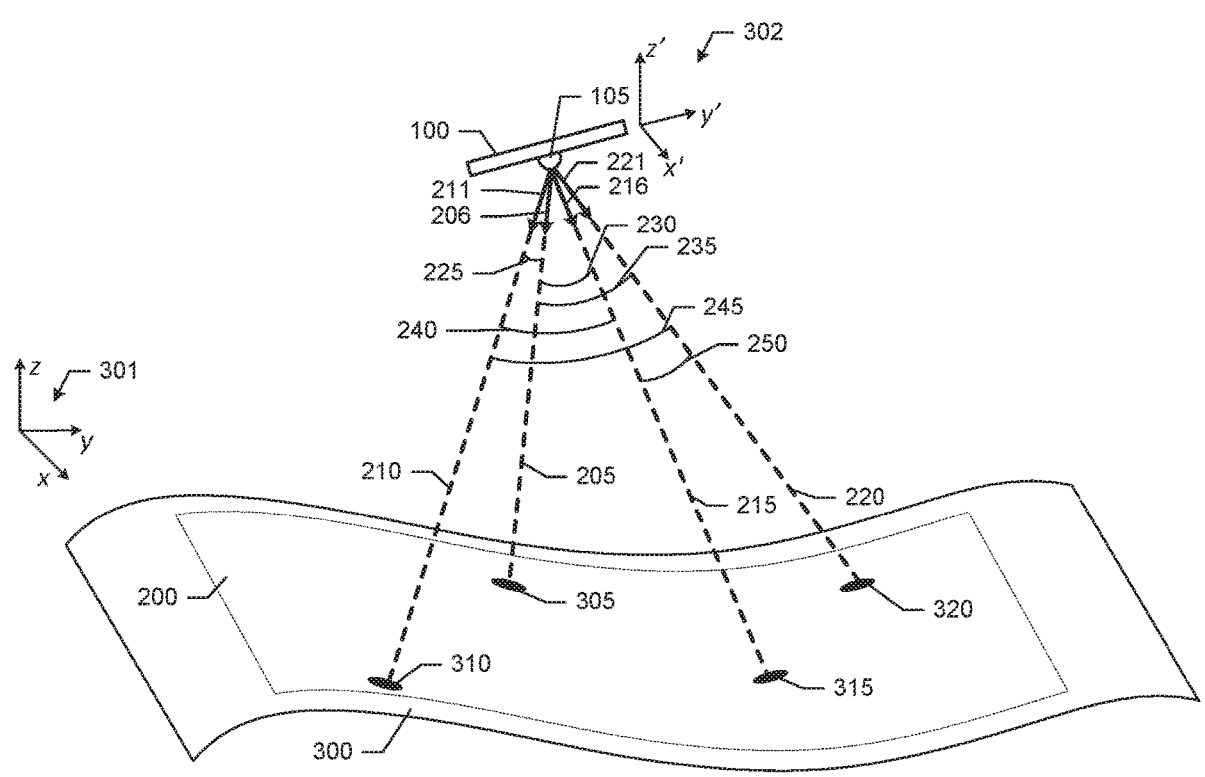
FIG. 4 illustrates a mobile device with an image sensor and apex angles between pairs of unit direction vectors for each marker pair within a plurality of markers according to some example embodiments.

A sensor coordinate frame 302 (or system) may also be defined with respect to the position and orientation of the imaging sensor 105. In this regard, the sensor coordinate frame 302 (x',y',z') may be defined such that the coordinate system is stationary relative to the position and orientation of the imaging sensor 105. FIGS. 1, 3, and 4 illustrate the sensor coordinate frame 302 with an origin that is offset from the position of the imaging sensor 105. However, according to some example embodiments, the origin of the sensor coordinate frame 302 may be located at the imaging sensor 105.

The mobile device 100 may also include processing circuitry (e.g., processing circuitry 505 of FIG. 5A or processing circuitry 551 of FIG. 5B) configured to receive the signals corresponding to the captured image from the imaging sensor 105. According to some example embodiments, as further described below, some or all image processing may be performed by processing circuitry that is local to the mobile device 100 or processing circuitry that is remote from the mobile device 100. In this regard, according to some example embodiments, the image processing functionalities described herein may be performed by processing circuitry of the mobile device 100 to determine a position or orientation of the mobile device 100. Alternatively, the signals corresponding to the captured image, or a variation thereof, may be transmitted from the mobile device 100 to a remote device configured to perform some or the entire image processing to determine the position or orientation of the mobile device 100. As such, the mobile device 100 may include a communications interface (e.g., communications interface 530 of FIGS. 5A and 5B) to communicate information to the remote device for processing.

The coordinate frame 301 and the sensor coordinate frame 302 may be any types of coordinate frames that may be used to define position and orientation within a three-dimensional space. In this regard, according to some example embodiments, the coordinate frame 301 and the sensor coordinate frame may be based on an x-y-z coordinate system where each axis is orthogonal to the other axes. Alternatively, other coordinate systems may be utilized such as polar coordinate systems to define the coordinate frame 301 and the sensor coordinate frame 302. According to some example embodiments, the dimensions of the coordinate frame 301 may correspond to latitude, longitude, and altitude. Further, according to some example embodiments, the coordinate frame 301 may be static or dynamic relative to a geographic coordinate system. The sensor coordinate frame 302 may be defined as a static coordinate system relative the imaging sensor 105. With respect to the coordinate frame 301, an example of a dynamic coordinate frame 301 relative to a geographic coordinate system may be a coordinate system that is defined with respect to another moving object. For example, the coordinate frame 301 may be defined such that the coordinate frame 301 is stationary with respect to an ocean-going vessel (e.g., a ship), an orbiting satellite, or the like.

As such, the surface 300 may be a surface that is defined relative to the coordinate frame 301. Following from the description above, the surface 300 may be static or stationary relative to the coordinate frame 301. In this regard, the surface 300 may be a surface of the Earth and may be defined with respect to a static geographic coordinate frame. Alternatively, the surface 300 may be a surface of an object that is moving relative to a geographic coordinate frame, such as a deck of a ship. As shown in FIG. 1, the surface 300 may be for example, a non-uniform, three-dimensional surface and may include various non-uniform features that can be considered when performing the image processing to determine a position or orientation of the mobile device 100.

The surface 300 may include a plurality of markers at various locations. While FIG. 1 illustrates surface 300 as including four markers 305, 310, 315, and 320, any number markers may be included on the surface 300. In this regard, according to some example embodiments, the presence of additional markers beyond four markers may be processed and may increase the accuracy of the position or orientation determination as further described below. As mentioned above, the markers 305, 310, 315, and 320 may be any recognizable feature having known three-dimensional coordinates in the coordinate frame 301. For example, the markers 305, 310, 315, and 320 may be objects or markings that have been specifically placed to operate as markers for position determination according to some example embodiments. Alternatively, the coordinates of the markers 305, 310, 315, and 320 may be known through use of surveying or another positioning technique to determine the coordinates of the markers 305, 310, 315, and 320. Alternatively, according to some example embodiments, the coordinates of the markers may be derived or identified via triangulation from previous images acquired by the imaging sensor 105 from multiple perspectives while the derived markers were within the fields-of-view and the images were acquired. The computation of the coordinates of derived markers may entail the use of the corresponding previously computed positions and orientations of the imaging sensor 105 when the multiple images were acquired. Some or all of the markers 305, 310, 315, and 320 may be lights or colored objects that are disposed on the ground around, for example, a landing location. However, according to some example embodiments, some or all of the markers 305, 310, 315, and 320 may be natural landmarks (e.g., a rock formation) or a man-made feature such as a corner of a building or an intersection of roads that have known coordinates. Further, according to some example embodiments, the markers 305, 310, 315, and 320 may be landmarks within an individual's body that have been mapped via, magnetic resonance imaging or the like, so that the coordinates of the markers 305, 310, 315, and 320 are known. As such, the coordinates of the markers 305, 310, 315, and 320 may be known and the markers 305, 310, 315, and 320 may disposed at fixed positions with respect to the coordinate frame 301. In this regard, the markers 305, 310, 315, and 320 may have respective (x,y,z) coordinates that may be used for processing as further described herein.

Further, according to some example embodiments, each of the markers 305, 310, 315, and 320 may be configured to transmit information to the mobile device 100 to indicate the coordinates of the respective marker. In this regard, a marker may include a wireless, radio frequency or optical transmitter configured to broadcast or otherwise output a signal having indications of the coordinates of the respective marker. In this manner, according to some example embodiments, the coordinates of the respective marker may become "known" to the mobile device and the processing circuitry configured to determine the position or orientation of the mobile device 100 via receipt of the signals from the marker. Further, the markers may be configured to communicate their respective coordinates to the mobile device 100 in other ways. For example, the markers may include a light that may be controlled to have on or off states that can indicate the coordinates of the respective marker. In this regard, image processing may be performed on a series of captured images of a given marker to determine a sequence and duration of the on and off states of the light to extract the coordinate information for use in the positioning or orientation determination process. Markers may also include bar codes, QR codes, or other visual representations of coordinate information.

Figure 2:
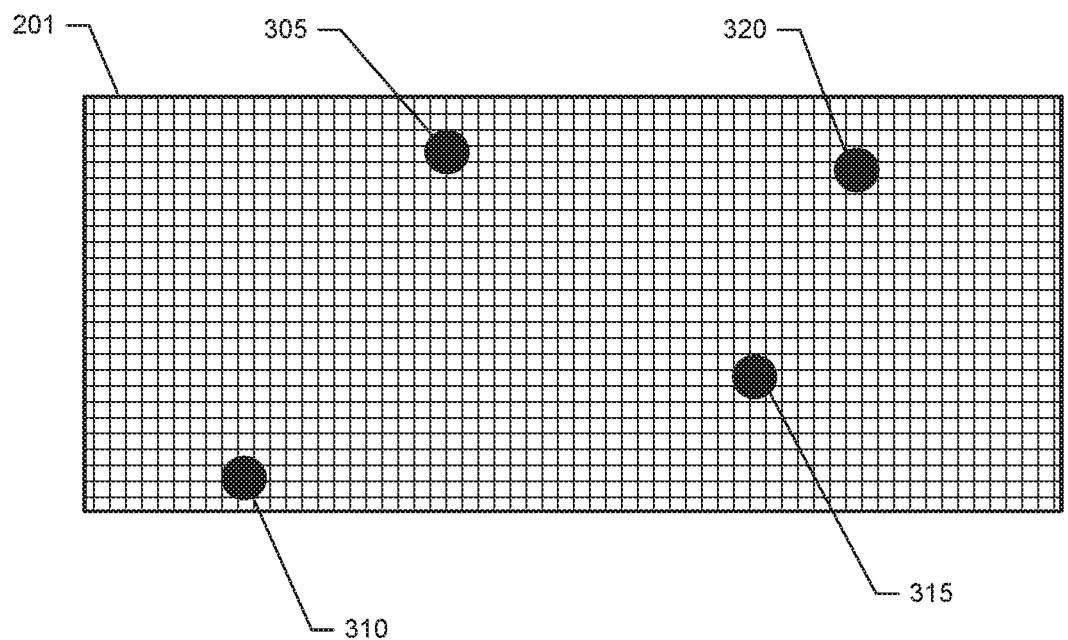
FIG. 2 illustrates a two-dimensional image of a surface including markers captured by an imaging sensor according to some example embodiments.

With respect to determining the position or orientation of the mobile device 100 as shown in FIG. 1, an image may be captured by the imaging sensor 105 of the field-of-view 200. The captured image may be provided to processing circuitry (e.g., processing circuitry 505 described below) for analysis to determine if markers are present within the captured image. As shown in FIG. 1, the markers 305, 310, 315, and 320 are within the field-of-view 200 of the imaging sensor 105. With reference to FIG. 2, an image 201 that corresponds to the field-of-view 200 is shown. In this regard, the image 201 is a two-dimensional image, of a portion of the surface 300 that falls within the field-of-view 200 of the imaging sensor 105.

According to some example embodiments, the image 201 may be processed to detect or identify any markers that may be present within the image 201. In this regard, processing circuitry may be configured to deconstruct the image 201 to identify recognizable features that may be candidate markers. These candidate markers may be used, according to some example embodiments, to query a feature database to determine a feature match thereby indicating the presence of a marker. Upon determining a feature match, coordinates for the corresponding marker may be returned, for example, from the feature database. Alternately, as described above, the coordinates of a marker may be communicated by the marker to the mobile device 100. Alternatively, image processing may be performed to identify a marker based on, for example, shape or color, and the coordinates for a given marker may be printed on the marker and therefore available to be determined directly via image processing.

According to some example embodiments, detecting markers within the image 201 may be performed via image processing using, for example, specific algorithms depending on the design of the markers and the expected scenery for a given application. For a given application, the appearance of the markers may be designed or selected to, for example, simplify the image processing by designing or selecting markers that have certain characteristics, such as, high contrast (e.g., more than a threshold amount) with the surrounding or background objects. Further, according to some example embodiments, image segmentation, thresholding, edge detection, feature extraction, and shape or color detection algorithms may be used to detect markers within the image 201. Additionally or alternatively, Hough transforms may be used to locate imperfect specific shapes within an image such as circles, ellipses, or lines.

In this regard, for example, if one were designing a system to land an aerial vehicle (e.g., mobile device 100) on a beach (e.g., surface 300), markers may be designed with high contrast to beach sand and no similarity to shells or other items that are likely to be found on a beach. With respect to detecting the markers within an image 201 of the beach, the image processing may implement algorithms to identify and remove sandy areas, probably by color, and then discriminate the markers from beach debris or shells by color or shape. Similarly, if derived markers were selected from a scene, the corners of buildings or rock ledges may be more readily detected as markers due to, for example, the sharp lines being more readily distinguishable from the background.

As such, in the example scenario shown in FIG. 2, image processing has been performed to identify a plurality of features that have been identified as markers 305, 310, 315, and 320. Pixel coordinates for each of markers 305, 310, 315, and 320 are therefore known due to, for example, the pixel coordinates being returned from the query to find feature matches or otherwise communicated to the processing circuitry configured to determine the position or orientation of the mobile device 100.

The image 201 is shown in FIG. 2 on a grid, where each grid box corresponds to a pixel of the image 201. In this regard, the imaging sensor 105 may be configured to capture images in accordance with a pixel count that is defined by a number of pixel rows by a number of pixel columns. As such, each pixel of the image 201 may be described by a respective row and column position within the image 201. Further, a unit direction vector may be defined for each pixel within the image 201 based on the position of the pixel within the image. The unit direction vectors that are associated with each pixel are defined with respect to the sensor coordinate frame 302. For example the pixel 'p' at the [row,column] coordinate of the image 201 may have an associated unit direction vector [X'p,Y'p,Z'p] in the sensor coordinate frame 302. Then the pixel at [row,column] in the image 201 conveys scene information in the direction [X'p, Y'p,Z'p] with respect to the sensor coordinate frame 302. In this regard, during calibration, each pixel of an image captured by the imaging sensor 105 may be associated with a respective unit direction vector based on expected marker distances (e.g., distance between a marker and the imaging sensor 105) for a given application. The imaging sensor 105 may be optically focused based on the expected marker distances within the depth of field associated with the focus setting. In this regard, for aerial or underwater applications, for example, the expected marker distance may be in the far-field of the imagining sensor 105 (e.g., greater than one meter away from the imaging sensor 105). Alternatively, for medical equipment control, the expected marker distance may be in the near-field (e.g., less than one meter away from the imaging sensor 105) and the imaging sensor 105 may be focused accordingly. According to some example embodiments, the expected marker distance may be an initial value based on the type of context of the application being performed. Additionally or alternatively, auto-focusing of the imaging sensor 105 may be performed and, based on the focusing parameters determined by the auto-focusing, a value for the expected marker distance may be determined.

According to some example embodiments, the pointing calibration and associated focus adjustment of the imaging sensor 105 fixes the bijective functional mapping, hereafter referred to as the pixel2UDV function, between pixels and unit direction vectors for all subsequent computations for imaged scenes that are within the depth of field for the particular focus setting. For each application, the calibration may be performed for all required focus settings of the imaging sensor 105. As such, each required focus setting for the imaging sensor 105 may have a unique pixel2UDV function. The unit direction vectors that are associated with each pixel of the imaging sensor 105 are applicable for computational purposes to scenes acquired with the same focus setting of the imaging sensor 105 that was used during calibration. For many applications, one focus setting may be required because the depth of field can cover a broad range of distances between the imaging sensor 105 and the imaged markers.

As such, a direction vector relationship may be associated with each pixel of the image 201 and the imaging sensor 105. As further described below, the direction vectors may be utilized to assist in determining a position of the mobile device 100 due to the principle that, while the direction vectors themselves are dependent upon the location and orientation of the mobile device 100, the angles between the direction vectors are dependent upon the position of the mobile device 100 and are not dependent upon the orientation of the mobile device 100. As such, since the unknown orientation of the mobile device 100 can be removed from consideration, the direction vectors and the angles between the direction vectors can be used to first determine the position of the mobile device 100, with the orientation of the mobile device 100 being determined once the position of the mobile device 100 is determined.

Accordingly, a direction vector may be associated with each pixel of the imaging sensor 105 and therefore each pixel of an image captured by the imaging sensor 105. With respect to FIG. 2, each identified marker 305, 310, 315, and 320 may be located within the image 201 and marker-to-pixel associations may be made. In this regard, according to some example embodiments, if the marker is smaller than or the same size as a pixel, then the marker may be associated with that pixel or interpolated between pixels. If, however, according to some example embodiments, the marker is larger than a single pixel, then a centroid of the marker may be calculated (e.g., based on the marker's size and shape) and the pixel at the centroid of the marker may associated with the marker. Based on the marker-to-pixel associations, unit direction vectors for each marker 305, 310, 315, and 320 may be determined.

With reference to FIG. 3, the respective linear extensions between the imaging sensor 105 and each of markers 305, 310, 315, and 320 are shown. In this regard, linear extension 205 is defined between the imaging sensor 105 and the marker 305, linear extension 210 is defined between the imaging sensor 105 and the marker 310, linear extension 215 is defined between the imaging sensor 105 and the marker 315, and linear extension 220 is defined between the imaging sensor 105 and the marker 320.

Building upon the linear extensions defined as shown in FIG. 3, FIG. 4 illustrates the linear extensions in relation to respective unit direction vectors of unit length. As mentioned above, the unit direction vectors may be defined with respect to an imaging sensor 105 and a surface 300 where the markers may be located. Accordingly, as shown in FIG. 4, unit direction vector 206 may be associated with marker 305 as indicated by linear extension 205, unit direction vector 211 may be associated with marker 310 as indicated by linear extension 210, unit direction vector 216 may be associated with marker 315 as indicated by linear extension 215, and unit direction vector 221 may be associated with marker 320 as indicated by linear extension 220. As such, the position of the mobile device 100 for purposes of the image processing as described herein is correlated to the apex of the pyramid (e.g., four-sided pyramid for a four marker process) formed by the linear extensions 205, 210, 215, and 220 and the markers 305, 310, 315, and 320 being positioned at the vertices of the base of the pyramid.

Continuing with reference to FIG. 4, apex angles between the unit direction vector pairs (and thus the linear extensions) may be defined. As such, the four unit direction vectors 206, 211, 216, and 221 may define six apex angles that exist between each pair of unit direction vectors. In FIG. 4, the angles are shown between the linear extensions 205, 210, 215, and 220 for ease of illustration. In this regard, a first apex angle 225 may be defined between unit direction vector 206 and unit direction vector 211. A second apex angle 230 may be defined between unit direction vector 206 and unit direction vector 216. A third apex angle 235 may be defined between unit direction vector 206 and unit direction vector 221. A fourth apex angle 240 may be defined between unit direction vector 211 and unit direction vector 216. A fifth apex angle 245 may be defined between unit direction vector 211 and unit direction vector 221. Finally, a sixth apex angle 250 may be defined between unit direction vector 216 and unit direction vector 221.

With these angular pairings defined, each of the apex angles 225, 230, 235, 240, 245, and 250 may be determined. In this regard, according to some example embodiments, a dot product operation may be performed between the unit direction vector pairs that define the respective angles to determine the angle values (e.g., in degrees or radians). As mentioned above, these angle values, according to some example embodiments, may be independent of the orientation of the mobile device 100 and the imaging sensor 105.

Having determined the apex angle values, according to some example embodiments, marker distances may be determined. The marker distances may be defined as the linear distance between the imaging sensor 105 and each of the markers 305, 310, 315, and 320. Accordingly, with reference to FIG. 4, the marker distances may be the respective lengths of the linear extensions 205, 210, 215, and 220.

According to some example embodiments, to determine the marker distances, an iterative process may be performed that converges on a solution. In this regard, for example, the marker distances may be determined via a recursive process using a generalized inverse of a non-square Jacobian Matrix, via an extension of Newton's multidimensional method for solving non-linear sets of equations when the number of equations exceeds the number of unknowns.

In this regard, with respect to the image processing computations, each of the marker distances may be defined by the variable $N_i$, which is the distance between the marker located at $(x_i, y_i, z_i)$ and the apex of the pyramid (e.g., image sensor 105) and where i is an indicator of the marker. In this regard, for example, i=1 for marker 305, i=2 for marker 310, i=3, for marker 315, and i=4 for marker 320. Further, the apex angle between two unit direction vectors may be represented as $\theta_{ij}$, which is the angle between the unit direction vector for marker i and the unit direction vector for marker j. Further, $d_{ij}$ represents the distance between marker i and marker j. Accordingly, using the law of cosines applied to the faces of the pyramid, six equations with four unknowns (i.e., the marker distances N) can be defined:

$$N_1^2 + N_2^2 - 2N_1N_2 \cos(\theta_{12}) = d_{12}^2$$

$$N_1^2 + N_3^2 - 2N_1N_3 \cos(\theta_{13}) = d_{13}^2$$

$$N_1^2 + N_4^2 - 2N_1N_4 \cos(\theta_{14}) = d_{14}^2$$

$$N_2^2 + N_3^2 - 2N_2N_3 \cos(\theta_{23}) = d_{23}^2$$

$$N_2^2 + N_4^2 - 2N_2N_4 \cos(\theta_{24}) = d_{24}^2$$

$$N_3^2 + N_4^2 - 2N_3N_4 \cos(\theta_{34}) = d_{34}^2$$

These equations can then be modified into function $H_i$ in preparation for insertion in a Jacobian Matrix $J_{F2}$ by moving all variables to one side of the equations:

$$H_1 = N_1^2 + N_2^2 - 2N_1N_2 \cos(\theta_{12}) - d_{12}^2$$

$$H_2 = N_1^2 + N_3^2 - 2N_1N_3 \cos(\theta_{13}) - d_{13}^2$$

$$H_3 = N_1^2 + N_4^2 - 2N_1N_4 \cos(\theta_{14}) - d_{14}^2$$

$$H_4 = N_2^2 + N_3^2 - 2N_2N_3 \cos(\theta_{23}) - d_{23}^2$$

$$H_5 = N_2^2 + N_4^2 - 2N_2N_4 \cos(\theta_{24}) - d_{24}^2$$

$$H_6 = N_3^2 + N_4^2 - 2N_3N_4 \cos(\theta_{34}) - d_{34}^2$$

A partial derivative of each of these $H_i$ functions may then be taken with respect to each of the $N_i$ variables to form the Jacobian Matrix $J_{F2ij} = \partial H_i / \partial N_j$ $$J_{F2} = \begin{pmatrix} 2N_1 - 2N_2\cos(\theta_{12}) & 2N_2 - 2N_1\cos(\theta_{12}) & 0 & 0 \\ 2N_1 - 2N_3\cos(\theta_{13}) & 0 & 2N_3 - 2N_1\cos(\theta_{13}) & 0 \\ 2N_1 - 2N_4\cos(\theta_{14}) & 0 & 0 & 2N_4 - 2N_1\cos(\theta_{14}) \\ 0 & 2N_2 - 2N_3\cos(\theta_{23}) & 2N_3 - 2N_2\cos(\theta_{23}) & 0 \\ 0 & 2N_2 - 2N_4\cos(\theta_{24}) & 0 & 2N_4 - 2N_2\cos(\theta_{24}) \\ 0 & 0 & 2N_3 - 2N_4\cos(\theta_{34}) & 2N_4 - 2N_3\cos(\theta_{34}) \end{pmatrix}$$

With the matrix defined, Newton's method may be employed based on the following equation where $X_i$ is an initial guess and the solution is found through an iterative, recursive process until convergence is obtained:

$$X_{n+1} = (J_{F2}{}^T J_{F2})^{-1}(J_{F2}{}^T)(-H) + X_n.$$

Upon convergence of the above equation (i.e., when the difference between magnitude of X on current iteration and the last iteration is sufficiently close to zero by less than a convergence value, such as, for example, 0.1), the marker distances are determined, because the magnitude of H approaches zero under convergence conditions with Newton's method. According to some example embodiments, a satisfactory convergence may be defined when the magnitude of H is less than, for example, 0.1, where the magnitude may be determined using a root-sum-squared method. According to some example embodiments, if convergence is not achieved in a threshold number of iterations (e.g., 20 iterations), then a new initial guess $X_1$ may be made to avoid a non-convergence event. According to some example embodiments, the initial guess may be based on a previous marker distance determination with respect to a previously captured image. According to some embodiments, the initial guess may be based on the expected marker distances from the context of the application. For example, the mobile device 100 may take off from an approximately known distance to the markers and this may be used as the initial guess.

With the marker distances determined, the marker distances may then be used to determine the position of the apex and thus the position of the mobile device 100. To determine the position of the apex, according to some example embodiments, a similar iterative, recursive process may be utilized with the six equations being based on the dot product:

$$(X_{apex}-X_i)(X_{apex}-X_j)+(Y_{apex}-Y_i)(Y_{apex}-Y_j)+(Z_{apex}-Z_i)(Z_{apex}-Z_j)=N_iN_j\cos(\theta_{ij})$$

where, again, i and j are each of the markers. Similar to the above, these equations may be formed in new H functions with all variables on one side of the equation and partial derivatives may be taken to populate a Jacobian Matrix $J_{F3}$. Again, with the matrix defined, Newton's method may be employed based on the following equation where $X_1$ is an initial guess and the solution is found through an iterative, recursive process until convergence is obtained:

$$X_{n+1} = (J_{F3}{}^T J_{F3})^{-1}(J_{F3}{}^T)(-H) + X_n.$$

Upon convergence of the above equation (i.e., when a subsequent iteration changes the solution by less than a convergence value), the apex coordinates and the position of the mobile device 100 with respect to the coordinate frame 301 are determined. According to some example embodiments, if convergence is not achieved in a threshold number of iterations, then a new initial guess $X_1$ may be made to avoid a non-convergence event. According to some example embodiments, the initial guess may be based on a previous determination with respect to a previously captured image. According to some embodiments, the initial guess may be based on the expected position based on the context of the application. For example, the position of the mobile device 100 at the beginning of image acquisition may be approximately known and may provide an initial guess.

In example embodiments where the image 201 includes more than four markers, an averaging process may be implemented to improve the position estimate. In this regard, for example, selections of four marker sets from the five or more markers may be made and a position of the mobile device 100 may be determined as provided herein for each set. In this regard, the maximum number of sets and thus positions that are to be determined may be [(A)*(A-1)*(A-2)*(A-3)/24], where A is the number of markers, the expression being equal to the number of ways to choose 4 markers from the set of A markers. Upon determining each of the positions for the mobile device 100, the coordinates may be averaged to determine a more accurate position estimate for the mobile device 100. Furthermore, according to some example embodiments, a Kalman filter or extended Kalman filter may be used to combine prior state estimates with the more accurate current position estimate to establish the final current position estimate.

Having determined the position of the mobile device 100, processing may continue to determine the orientation of the mobile device 100 with respect to the coordinate frame 301. In this regard, the orientation (e.g., pitch, yaw, roll) may be determined using the position of the mobile device 100 that was determined for the same captured image 201. In this regard, one or more rotation matrices may be formed as a function of the position of the mobile device 100 and the coordinates of at least three markers. According to some example embodiments, a rotation matrix may be determined via a relationship amongst a mobile device position matrix, a marker matrix, and a marker matrix in mobile device frame. In this regard, the mobile device position matrix K may be represented as:

$$K = \begin{pmatrix} X_{apex} & Y_{apex} & Z_{apex} \\ X_{apex} & Y_{apex} & Z_{apex} \\ X_{apex} & Y_{apex} & Z_{apex} \end{pmatrix}$$

The marker position matrix B for any 3 markers 1, 2, and 3 may be represented by the x, y, and z coordinates of the markers in the coordinate frame 301 as follows:

$$B = \begin{pmatrix} B_{x1} & B_{y1} & B_{z1} \\ B_{x2} & B_{y2} & B_{z2} \\ B_{x3} & B_{y3} & B_{z3} \end{pmatrix}$$

To solve for the rotation matrix R, it may be necessary to first compute the marker position matrix B' in the sensor coordinate frame (x',y',z') 302. The $i^{th}$ marker with pixel coordinates [row, column] may be the product of the distance to the marker $N_i$ and the unit direction vector that is associated with the pixel coordinates of the marker, or equivalently $(N_i)$pixel2UDV([row,column]). Thus, this vector may be the $i^{th}$ row of B'. The marker position matrix B' in the sensor coordinate frame (x',y',z') 302 may also equal to B'=(B−K)R, by virtue of the translation and rotation necessary to transform the marker positions in coordinate frame (x,y,z) 301 into the sensor coordinate frame (x',y',z') 302, and is represented as:

$$B' = \begin{pmatrix} B_{x'1} & B_{y'1} & B_{z'1} \\ B_{x'2} & B_{y'2} & B_{z'2} \\ B_{x'3} & B_{y'3} & B_{z'3} \end{pmatrix}$$

Thus, to determine the rotation matrix R, the relationship $R=(B-K)^{-1}B'$ may be used, with all quantities on the right side of the equation known. The values taken from the rotation matrix R may indicate the orientation of the imaging sensor 105 in the coordinate frame 301. Specifically, the Euler yaw angle in radians of the imaging sensor 105 is the four quadrant arctangent (R(2,1),R(1,1)), the Euler pitch angle in radians of the imaging sensor 105 is equal to −arcsin(R(3,1)), and the Euler roll angle in radians of the imaging sensor 105 is the four quadrant arctangent(R(3,2), R(3,3)).

Additionally, according to some example embodiments, the orientation of the of the mobile device 100 may be determined more accurately by generating an average rotational matrix. In this regard, as many as [(A)*(A−1)*(A−2)/6] rotation matrices may be formed where A is the number of markers, the expression being equal to the number of ways to choose 3 markers from the set of A markers. As such, for each subset of 3 markers out of A, a rotation matrix may be determined. These rotation matrices may then be averaged to form an average rotation matrix from the set of rotation matrices to determine a more accurate current orientation estimate. Furthermore, a Kalman filter or extended Kalman filter may be used to combine prior state estimates with the more accurate current orientation estimate to establish the final current orientation estimate.

Figure 5A:
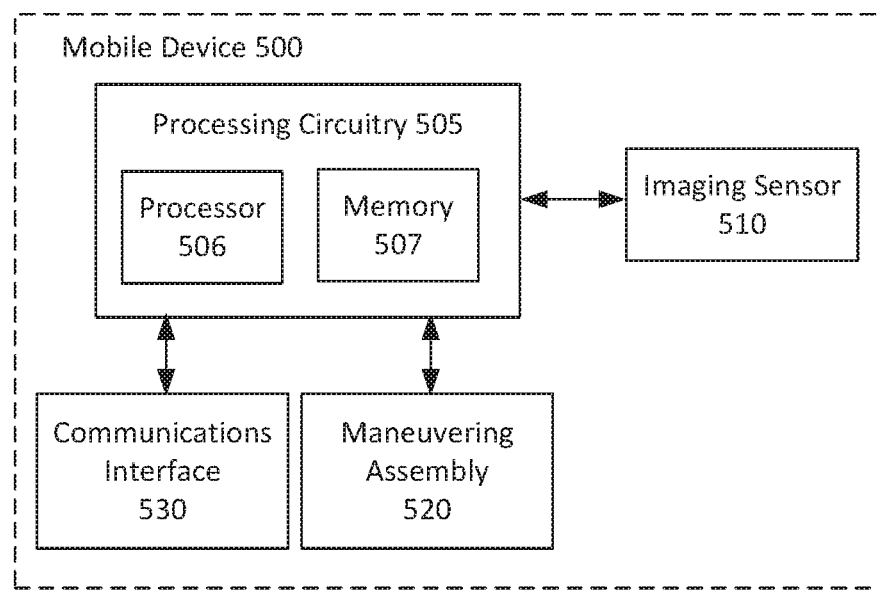
FIG. 5A illustrates a block diagram of an example mobile device with processing circuitry configured to determine a position or orientation of the mobile device disposed local to the mobile device according to some example embodiments.
Figure 5B:
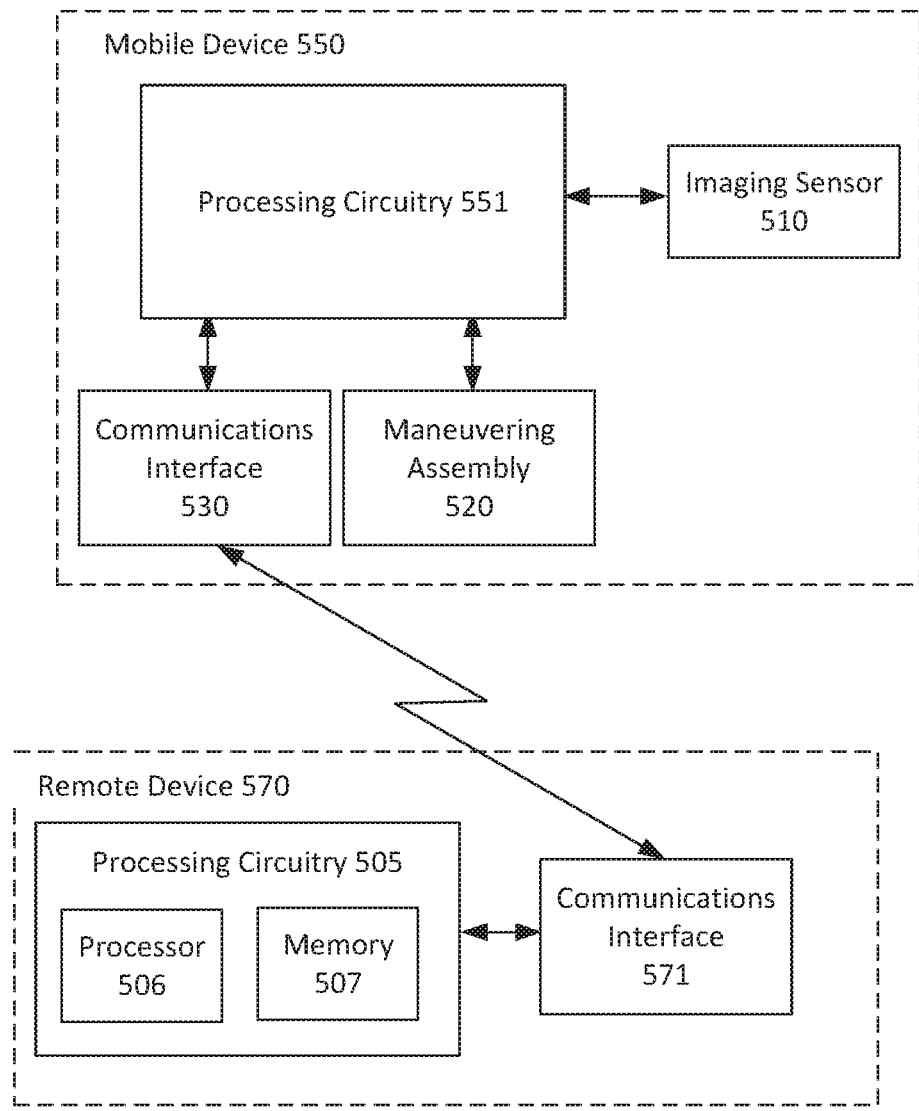
FIG. 5B illustrates a block diagram of an example mobile device with processing circuitry configured to determine a position or orientation of the mobile device disposed remote from the mobile device according to some example embodiments.

FIGS. 5A and 5B illustrate block diagrams of apparatuses and systems that may be configured to determine a position or orientation of a mobile device (e.g., mobile device 100) as described herein. In this regard, with respect to FIG. 5A, a mobile device 500 is shown that may, according to some example embodiments, be an embodiment of the mobile device 100 as described above. In this regard, the mobile device 500 may include the components of the mobile device 100 as described above and may be configured to operate in the same or similar manner as the mobile device 100. The mobile device 500 may include processing circuitry 505, an imaging sensor 510, a maneuvering assembly 520, and a communications interface 530.

The processing circuitry 505 may be in operative communication with the imaging sensor 510 and a maneuvering assembly 520. According to some example embodiments, the processing circuitry 505 may also be in operative communication with a communications interface 530. The processing circuitry 505 may interact with or embody a memory 507 and a processor 506. The processing circuitry 505 may be configurable to perform various operations as described herein. In this regard, the processing circuitry 505 may be configured to perform computational processing (e.g., image processing) and memory management according to some example embodiments to facilitate performing various functionalities.

In some embodiments, the processing circuitry 505 may be embodied as a chip or chip set. In other words, the processing circuitry 505 may comprise one or more physical packages (e.g., chips) including materials, components or wires on a structural assembly (e.g., a baseboard). According to some example embodiments, the processing circuitry 505 may be a computing cluster that includes a number of processors configured to operate in parallel to more rapidly complete tasks. The processing circuitry 505 may be configured to receive inputs such as from the imaging sensor 510, perform actions based on the inputs, and generate outputs to, for example, maneuver the mobile device 500 via control of the maneuvering assembly 520. In an example embodiment, the processing circuitry 505 may include one or more instances of a processor 506, associated circuitry, and a memory 507. As such, the processing circuitry 505 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 507 may include one or more non-transitory memory devices such as, for example, volatile or non-volatile memory that may be either fixed or removable. The memory 507 may be configured to store information, data, applications, instructions or the like for enabling, for example, position or orientation determination and the like to carry out various functions in accordance with example embodiments. For example, the memory 507 could be configured to buffer input data for processing by the processing circuitry 505. Additionally or alternatively, the memory 507 could be configured to store instructions for execution by the processing circuitry 505. Among the contents of the memory, applications may be stored for execution by the processing circuitry 505 in order to carry out the functionality associated with each respective application. Further, according to some example embodiments, a feature database that may be used to identify markers and associated coordinates for the markers may be stored in the memory 507.

As mentioned above, the processing circuitry 505 may be embodied in a number of different ways. For example, the processing circuitry 505 may be embodied as various processing means such as one or more processors that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 505 may be configured to execute instructions stored in the memory or otherwise accessible to the processing circuitry 505. As such, whether configured by hardware or by a combination of hardware and software, the processing circuitry 505 may represent an entity (e.g., physically embodied in circuitry—in the form of processing circuitry 505) capable of performing operations according to example embodiments while configured accordingly. Thus, for example, when the processing circuitry 505 is embodied as an ASIC, FPGA, or the like, the processing circuitry 505 may be specifically configured hardware for conducting the operations described herein. Alternatively, as another example, when the processing circuitry 505 is embodied as an executor of software instructions, the instructions may specifically configure the processing circuitry 505 to perform the operations described herein.

The imaging sensor 510 may be same or similar to the imaging sensor 105 described above. The imaging sensor 510 may be in operable communication with the processing circuitry 505 to facilitate transmission of signals associated with an image capture. The imaging sensor 510 may be configured to capture an image of a field-of-view of the imaging sensor 510. In this regard, according to some example embodiments, the imaging sensor 510 may be configured to capture a two-dimensional image of the sensor's field-of-view.

The maneuvering assembly 520 may be same or similar to the maneuvering assembly described above. In this regard, the maneuvering assembly 520 may be configured to control the physical movement of the mobile device 100 within the environment. The maneuvering assembly 520 may include one or more motors that may rotate propellers, wheels, or the like to cause the mobile device 500 to move. Further, the maneuvering assembly 520 may include steering components (e.g., moveable flaps, wheel pivot actuators, control cables, or the like) configured to control a direction of movement of the mobile device 500.

The communications interface 530 may include one or more interface mechanisms for enabling communication with other devices external to mobile device 500, via, for example, a network, such as a wireless network. In some cases, the communication interface 530 may be any means such as a device or circuitry embodied in either hardware, or a combination of hardware and software that is configured to receive or transmit data from/to devices in communication with the processing circuitry 505. According to some example embodiments, the communications interface 530 may include a radio and an antenna to facilitate wireless communications. According to some example embodiments, the communications interface 530 may include optical fibers or waveguides to facilitate free-space optical communications. The communications interface 530 may support one or more communications protocols. In this regard, the communications interface 530 and the antenna may support communications via, for example, Bluetooth or WIFI connections.

While FIG. 5A illustrates a localized solution where the processing circuitry 505 is configured to determine the position or orientation of the mobile device 500, FIG. 5B illustrates another example embodiment where the processing circuitry 505 configured to determine the position or orientation a mobile device 550 is located remote from the mobile device 550. In this regard, the mobile device 550 may include processing circuitry 551, as well as the imaging sensor 510, maneuvering assembly 520, and the communications interface 530. In this regard, processing circuitry 551 may be configured to cause imaging sensor 510 to capture an image, but rather than performing all position or orientation determination operations locally at the processing circuitry 551, the processing circuitry 551 may provide signals associated with the captured image to the communications interface 530 for transmission to remote device 570.

In this regard, the signals associated with the captured image may be transmitted, for example wirelessly, or via free-space optical signals to the communications interface 571 and provided to the processing circuitry 505. The processing circuitry 505, now located at the remote device 570, may be configured to determine the position or orientation of the mobile device 550. Further, according to some example embodiments, the position or orientation may be transmitted back to the mobile device 550 to facilitate maneuvering or navigation performed by the processing circuitry 551 in communication with the maneuvering assembly 520. Alternatively, the processing circuitry 505 of the remote device 570 may be configured to determine maneuvering or navigation instructions for the mobile device 550 based on the position or orientation determination and the maneuvering or navigation instructions may be transmitted to the mobile device 550 such that the processing circuitry 551 may communicate the maneuvering or navigation instructions to the maneuvering assembly 520.

The system shown in FIG. 5B may have an advantage in that substantial processing power is located at the remote device 570. In this way, weight, space, and power consumption associated with the processing circuitry 505 may realized at the remote device 570, which may be less sensitive to weight, space, and power consumption considerations. For example, in a system where the mobile device 550 is an aerial drone, having the image processing performed at the remote device 570 may reduce the weight, size, and power consumption of the aerial drone allowing the aerial drone to be smaller and support longer flight times due to less power consumption. Further, the processing circuitry 551 may be smaller, lower power consumption device that is configured to support communications to provide signals associated with the captured image and receive signals indicating a position or orientation of the mobile device 550 or maneuvering and navigation instructions for provision to the maneuvering assembly 520. According to some example embodiments, the remote device 570 may be one or more stationary base stations that are in communications range with the mobile device 550 or a handheld controller.

Regardless of the physical location of the processing circuitry 505, the processing circuitry 505 may be configured to receive signals associated with a captured image and perform image processing to determine a position or orientation of a mobile device (e.g., mobile device 500 or mobile device 550). Accordingly, the processing circuitry 505 may be configured to perform various functionalities to achieve the technical result of determining a position or orientation of a mobile device 500 or 550. In an example embodiment, the processing circuitry 505 may be embodied as, include or otherwise control, the mobile device 500 or 550 to perform various functionalities as described herein. As such, in some embodiments, the processing circuitry 505 may be said to cause some of the operations described in connection with, for example, a method described by the flowchart of FIG. 6. The processing circuitry 505 may therefore undertake the corresponding functionalities responsive to execution of instructions or algorithms configuring the processing circuitry 505 accordingly. The processing circuitry 505 may provide programmable control signals, selections, and the like to control the operation of the mobile device 500 or 550 responsive to execution of instructions stored in the memory.

Figure 6:
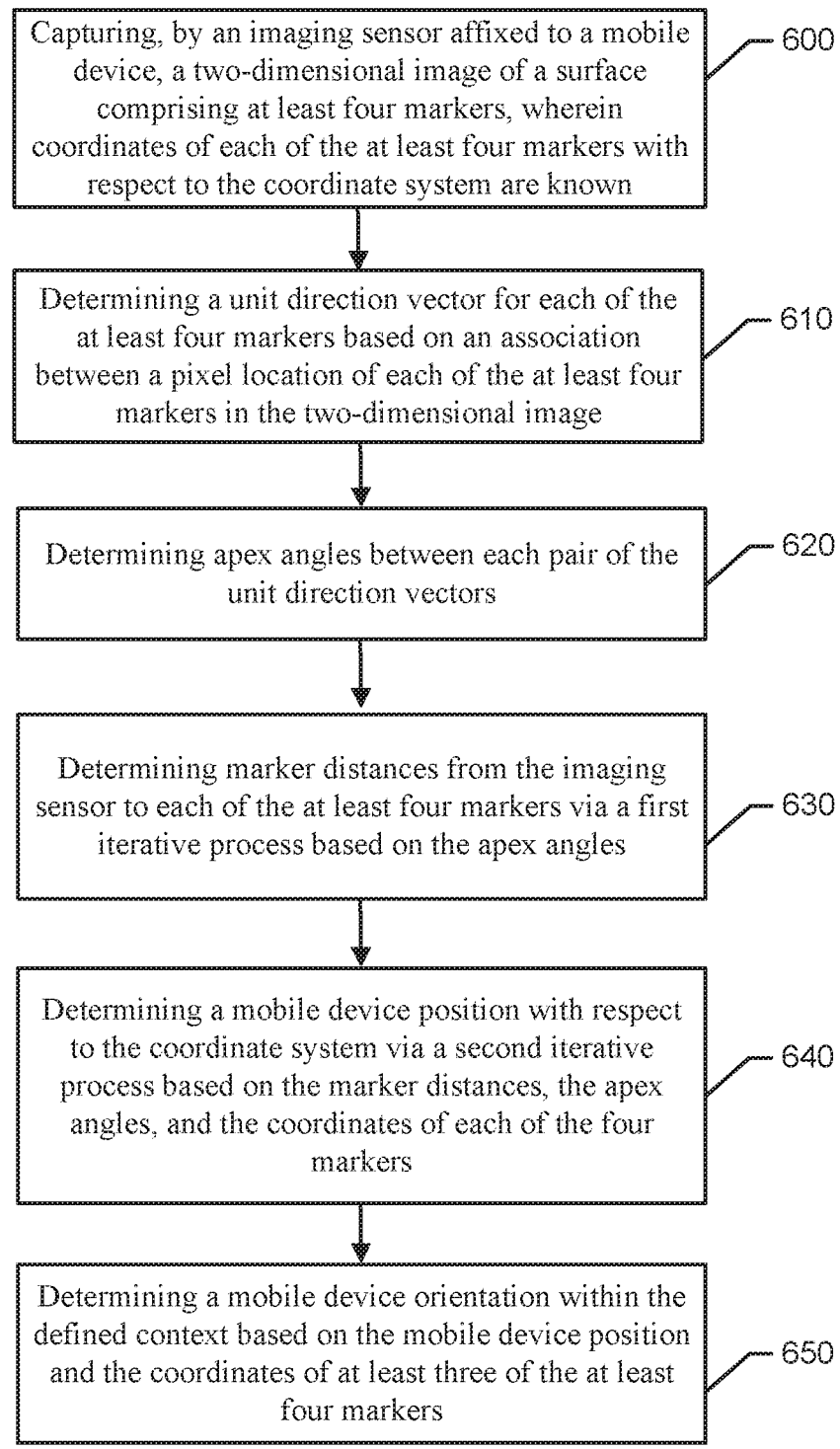
FIG. 6 shows an exemplary block diagram of a method for determining a position or orientation of a mobile device according to various example embodiments.

In this regard, the processing circuitry 505 may be configured to perform, or cause the performance of the operations of, the example method described with respect to FIG. 6 to determine a position or orientation of a mobile device, such as mobile device 500 or 550. In this regard, at 600, the example method may include capturing, by an imaging sensor affixed to the mobile device and controlled by processing circuitry, a two-dimensional image of a surface comprising at least four markers. In this regard, coordinates of each of the at least four markers with respect to the coordinate frame or system may be known. The processing circuitry 505, according to some example embodiments, may be configured to request that an image capture be performed by the image sensor 510. Alternatively, the image sensor 510 may be configured to perform image capture operations at regular (or irregular) intervals for provision to the processing circuitry 505. Accordingly, the processing circuitry 505 may be configured to receive signals associated with an image capture (either locally or remotely) to perform image processing as described herein.

At 610, the example method may include determining, via the processing circuitry 505, a unit direction vector for each of the at least four markers based on an association between a pixel location of each of the at least four markers in the two-dimensional image. Further, at 620, the example method may also include determining, via the processing circuitry 505, apex angles between each pair of the unit direction vectors (i.e., the angles between each of the unit direction vectors and each of the other unit direction vectors), and, at 630, determining, via the processing circuitry 505, marker distances from the imaging sensor to each of the at least four markers via a first iterative process based on the apex angles. At 640, the example method may further include determining, via the processing circuitry 505, the mobile device position with respect to the coordinate frame via a second iterative process based on the marker distances, the apex angles, and the coordinates of each of the at least four markers. Additionally, according to some example embodiments, the example method may also include, at 650, determining, via the processing circuitry 505, a mobile device orientation relative to the coordinate frame based on the mobile device position and the coordinates of at least three of the at least four markers.

Additionally or alternatively, the example method may include performing a navigation maneuver of the mobile device based on the mobile device position. In this regard, the instructions may be provided to the maneuvering assembly 520 either locally or remotely to perform the navigation maneuver. Additionally or alternatively, determining the apex angles via the processing circuitry 505 may include determining the apex angles via a dot product operation. Additionally or alternatively, the example method may further comprise determining, via the processing circuitry 505, a mobile device orientation relative to the coordinate frame via at least one rotation matrix based on the mobile device position and the coordinates of at least three of the at least four markers. Additionally or alternatively, determining the marker distances may include determining, via the processing circuitry 505, the marker distances based on a an earlier mobile device position determined via a previously captured two-dimensional image. Additionally or alternatively, the coordinate frame may be dynamic relative to a static geographic coordinate system. Additionally or alternatively, the example method may include receiving, at the processing circuitry 505, respective signals associated with signals from transmitters at each of the at least four markers. In this regard, each respective signal may include indications of the coordinates of a respective marker relative to the coordinate frame.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
   capturing, by an imaging sensor affixed to a mobile device, a two-dimensional image of a surface comprising at least four markers, wherein coordinates of each of the at least four markers with respect to a coordinate frame are known;
   determining a unit direction vector for each of the at least four markers based on an association between a pixel location of each of the at least four markers in the two-dimensional image;
   determining, via processing circuitry, apex angles between each pair of the unit direction vectors;
   determining, via the processing circuitry, marker distances from the imaging sensor to each of the at least four markers via a first iterative process based on the apex angles;
   determining, via the processing circuitry, the mobile device position with respect to the coordinate frame via a second iterative process based on the marker distances, the apex angles, and the coordinates of each of the at least four markers; and
   performing a navigation maneuver of the mobile device based on the mobile device position.

2. The method of claim 1 further comprising determining a mobile device orientation with respect to the coordinate frame based on the mobile device position and the coordinates of at least three of the at least four markers.

3. The method of claim 1 wherein determining the apex angles includes determining the apex angles via a dot product operation.

4. The method of claim 1 further comprising determining a mobile device orientation relative to the coordinate frame via at least one rotation matrix based on the mobile device position and the coordinates of at least three of the at least four markers.

5. The method of claim 1 wherein determining the marker distances includes determining the marker distances based on an earlier mobile device position determined via a previously captured two-dimensional image.

6. The method of claim 1, wherein the coordinate frame is dynamic relative to a static geographic coordinate system.

7. The method of claim 6, further comprising receiving respective signals associated with signals from transmitters at each of the at least four markers, each respective signal including indications of the coordinates of a respective marker relative to the coordinate system.

8. The method of claim 1 wherein determining the marker distances comprises generating a first Jacobian matrix populated based on the apex angles and performing the first iterative process on the first Jacobian matrix iteratively and recursively until convergence occurs at the marker distances;
  wherein determining the mobile device position comprises generating a second Jacobian matrix populated based on based on the marker distances and performing the second iterative process on the second Jacobian matrix iteratively and recursively until convergence occurs at coordinates for the mobile device position.

9. The method of claim 1, wherein an initial input to the first iterative process for the marker distances may be selected based on focusing parameters determined via auto-focusing of the image sensor.

10. A system comprising:
  a mobile device comprising an imaging sensor affixed to a body of the mobile device, the imaging sensor configured to capture two-dimensional images; and
  processing circuitry configured to receive the captured two-dimensional images from the imaging sensor for processing, the processing circuitry being configured to:
    receive a two-dimensional image comprising at least four markers from the imaging sensor, wherein coordinates of each of the at least four markers with respect to a coordinate frame are known;
    determine a unit direction vector for each of the markers based on an association between a pixel location of each of the at least four markers in the two-dimensional image;
    determine apex angles between each pair of the unit direction vectors;
    determine marker distances from the imaging sensor to each of the at least four markers via a first iterative process based on the apex angles;
    determine a position of the mobile device with respect to the coordinate frame via a second iterative process based on the marker distances, the apex angles, and the coordinates of each of the at least four markers; and
    control movement of the mobile device to perform a navigation maneuver based on the mobile device position.

11. The system of claim 10, wherein the processing circuitry is further configured to determine a mobile device orientation relative to the coordinate frame based on the mobile device position and the coordinates of at least three of the at least four markers.

12. The system of claim 10 wherein the processing circuitry configured to determine the apex angles includes being configured to determine the apex angles via a dot product operation.

13. The system of claim 10 wherein the processing circuitry is further configured to determine a mobile device orientation relative to the coordinate frame via at least one rotation matrix based on the mobile device position and the coordinates of at least three of the at least four markers.

14. The system of claim 10 wherein the processing circuitry configured to determine the marker distances includes being configured to determine the marker distances based on an earlier mobile device position determined via a previously captured two-dimensional image.

15. The system of claim 10, wherein the processing circuitry is further configured to receive respective signals associated with signals from transmitters at each of the markers, the respective signals including indications of the coordinates of a respective marker relative to the coordinate frame.

16. An unmanned aerial vehicle comprising:
  a maneuvering assembly that is controllable to change a position, orientation, and direction of travel of the unmanned aerial vehicle;
  an imaging sensor affixed to a body of the unmanned aerial vehicle, the imaging sensor configured to capture two-dimensional images; and
  processing circuitry configured to control the maneuvering assembly and receive the captured two-dimensional images from the imaging sensor for processing, the processing circuitry being configured to:
    receive a two-dimensional image comprising at least four markers from the imaging sensor, wherein coordinates of each of the at least four markers with respect to a coordinate frame are known;
    determine a unit direction vector for each of the markers based on an association between a pixel location of each of the at least four markers in the two-dimensional image;
    determine apex angles between each pair of the unit direction vectors;
    determine marker distances from the imaging sensor to each of the at least four markers via a first iterative process based on the apex angles; and
    determine a position of the unmanned aerial vehicle with respect to the coordinate frame via a second iterative process based on the marker distances, the apex angles, and the coordinates of each of the at least four markers.

17. The unmanned aerial vehicle of claim 16, wherein the processing circuitry is further configured to determine a vehicle orientation relative to the coordinate frame based on the vehicle position and the coordinates of at least three of the at least four markers.

18. The unmanned aerial vehicle of claim 16, wherein the processing circuitry is further configured to control the maneuvering assembly to perform a navigation maneuver based on the vehicle position.

19. The unmanned aerial vehicle of claim 16, wherein the processing circuitry is further configured to determine a vehicle orientation relative to the coordinate frame via at least one rotation matrix based on the position of the unmanned aerial vehicle and the coordinates of at least three of the at least four markers.

* * * * *